(12) United States Patent
Samukawa et al.

(10) Patent No.: US 6,288,148 B1
(45) Date of Patent: Sep. 11, 2001

(54) ACRYLIC EMULSIONS CONTAINING TACKIFIERS, PROCESSES FOR PREPARING THEM, AND ADHESIVE TAPE CONTAINING ACRYLIC EMULSIONS CONTAINING TACKIFIERS

(75) Inventors: Hiroshi Samukawa; Kazuki Shibata, both of Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/341,866

(22) PCT Filed: Nov. 25, 1998

(86) PCT No.: PCT/JP98/05292

§ 371 Date: Jul. 30, 1999

§ 102(e) Date: Jul. 30, 1999

(87) PCT Pub. No.: WO99/33880

PCT Pub. Date: Jul. 8, 1999

(30) Foreign Application Priority Data

Dec. 26, 1997 (JP) .................................... 9-367938

(51) Int. Cl.[7] ................ C08F 2/44; C08F 2/22; C08F 265/06; C09J 7/02; C09J 133/06
(52) U.S. Cl. .................... 524/77; 524/272; 524/457; 524/458; 524/461; 524/529; 524/533; 524/764; 525/244; 525/267; 526/931; 428/343; 428/355
(58) Field of Search ........................... 524/458, 460, 524/461, 529, 533, 77, 272, 764, 457; 526/238.3, 931; 525/244, 267; 428/343, 355

(56) References Cited

U.S. PATENT DOCUMENTS 4,939,190 * 7/1990 Tomioka et al. .................. 523/206

FOREIGN PATENT DOCUMENTS

| 58185668 | * | 10/1983 | (JP) | ................... | C08F/2/22 |
| 2080482 | * | 3/1990 | (JP) | ................... | C08F/2/24 |
| 4178402 | * | 6/1992 | (JP) | ................... | C08F/2/44 |

* cited by examiner

Primary Examiner—David W. Wu
Assistant Examiner—Kelechi Egwim
(74) Attorney, Agent, or Firm—Oliff & Berridge, PLC

(57) ABSTRACT

Acrylic emulsions are obtained by carrying out a polymerization reaction of a first acrylic monomer dispersion, adding a second acrylic monomer dispersion, and carrying out a further polymerization reaction wherein the first acrylic monomer dispersion contains acrylic monomer and tackifier in a first proportion to acrylic monomer contained in the first acrylic monomer dispersion and wherein the second acrylic monomer dispersion contains acrylic monomer and tackifier in a second proportion to acrylic monomer contained in the second acrylic monomer dispersion, and wherein the proportion of tackifier in the first acrylic monomer dispersion is lower than the proportion of tackifier in the second acrylic monomer dispersion. A high molecular weight acrylic polymer is obtained when the first acrylic monomer dispersion is polymerization reacted. The second acrylic monomer dispersion is added to the first acrylic monomer dispersion after the first acrylic monomer dispersion is polymerization reacted. The tackifier is added to the acrylic polymer when the first acrylic monomer dispersion is further polymerized with the second acrylic monomer dispersion. Thus, holding power and adhesion are improved at the same time.

16 Claims, 4 Drawing Sheets

Fig. 3
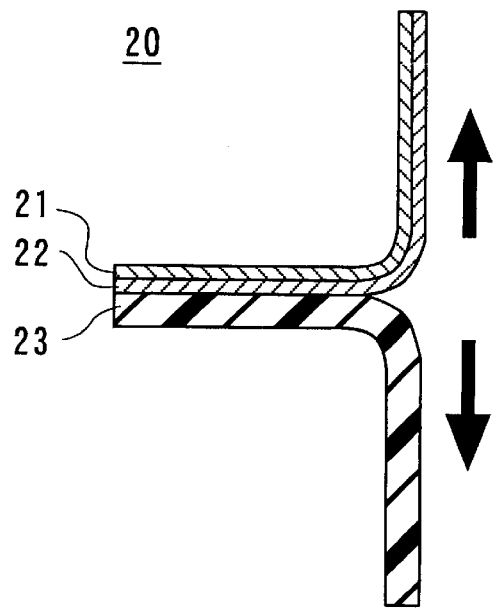
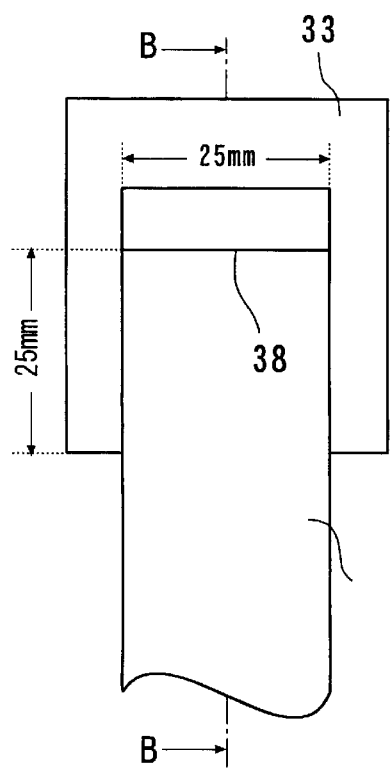
Fig. 4a
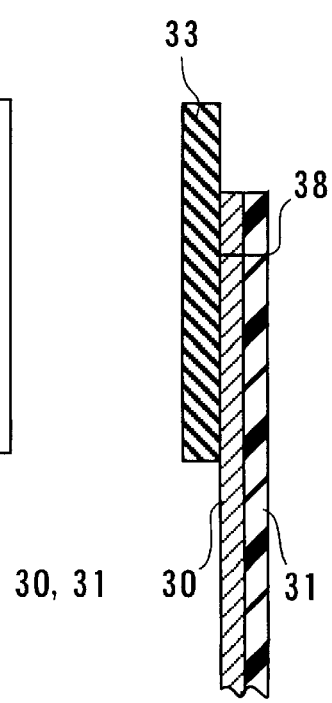
Fig. 4b
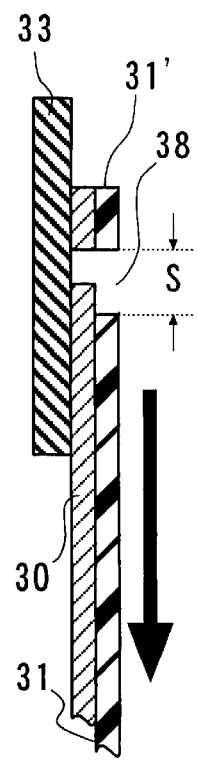
Fig. 4c

ACRYLIC EMULSIONS CONTAINING TACKIFIERS, PROCESSES FOR PREPARING THEM, AND ADHESIVE TAPE CONTAINING ACRYLIC EMULSIONS CONTAINING TACKIFIERS

FIELD OF THE INVENTION

The present invention relates to the technical field of aqueous acrylic emulsions with excellent adhesion, particularly to the technical field for bonding materials having unsmooth surfaces, i.e. polymer foams such as urethane foams, polyolefin foams, rubber foams; fibrous materials such as paper, cloth, non-woven fabric; or materials roughened on their surfaces by embossing, abrasion, chemical treatment or the like to each other or to other materials.

PRIOR ART

Solvent-type acrylic adhesives obtained by solution polymerization are used by suitably changing their composition, molecular weight, molecular weight distribution or the like to well balance their adhesive characteristics for the intended use. However, the use of solvents has recently posed environmental problems, which prompted attempts to replace solvent-based adhesives by aqueous ones, but acrylic emulsions prepared by emulsion polymerization with the composition unchanged often show poor water resistance or lowered adhesion. It has been known that this is because the surfactants used are localized on the surface or emulsion particles are wholly not fused to each other during drying to hinder homogenization.

A known effective solution to this problem is to add a tackifier into acrylic emulsions. However, some special techniques are required to add an oily resin tackifier into aqueous acrylic emulsions. Such previously known techniques include:

1) absorbing a tackifier dissolved in a solvent to acrylic emulsion particles, and
2) mechanically dispersing a tackifier into emulsion and then mixing it with an acrylic emulsion.

However, the first technique 1) has the problem that the resulting acrylic emulsion is less stable and includes the solvent. The second technique 2) has the problem that the surfactant used for emulsifying the tackifier is excessively included or the effect of adding a tackifier can not be sufficiently produced because the tackifier is hardly homogenized with acrylic resins during drying.

In order to solve these problems, JPA No. 23641/79 proposes an acrylic emulsion obtained by emulsion polymerization of acrylic monomers in which a tackifier has been dissolved. JPB No. 30351/90 proposes a process for more stably preparing such an acrylic emulsion. Furthermore, JPA No. 80482/90 describes that tackifiers can efficiently be incorporated into particles by emulsion polymerization of acrylic monomers in which the tackifiers have been dissolved in the presence of a seed polymer.

These disclosures suggest that tackifier particles are divided as finely as acrylic emulsions to allow them to be readily homogenized with acrylic resins. However, the existence of tackifiers during emulsion polymerization has the serious problem of lowering the molecular weight of the acrylic polymer and thus extremely lowering its cohesive force because they generally act as potent chain transfer agents. Therefore, all of the above disclosures rely on positively enhancing the crosslinking density with a crosslinkable monomer or abundantly including a relatively cohesive monomer to prevent lowering of cohesive force.

However, such procedures impose a considerable limitation on balancing characteristics of adhesives. Namely, an enhanced crosslinking density or an abundant cohesive element impairs wettability and therefore adhesion. Particularly, it has the disadvantage of impairing adhesion to polyolefin materials or rough surfaces, especially to polymer foams.

JPA No. 178402/92 points out this problem and proposes that a seed polymer having a high swell for solvents should be preliminarily prepared and subsequently an acrylic monomer containing a tackifier dissolved therein should be polymerized in emulsion to facilitate absorption of the tackifier into particles of the seed during polymerization and thus to obtain a good holding power without increasing the crosslinking density.

However, in this disclosure, 65% or more of the acrylic monomer is consumed to preliminarily polymerize a seed polymer and uses a multifunctional monomer and a chain transfer agent in combination for crosslinking so that the entire system finally has a high crosslinking density. Thus, this solution would not provide a polymer with tackifier having a sufficiently low crosslinking density, therefore having a good wettability enough to sufficiently give adhesion to polyolefin materials or rough surfaces, particularly polymer foams.

The present invention was made to overcome the above disadvantages of the prior art and aims to improve adhesion and holding power of acrylic emulsions, adhesive compositions using said acrylic emulsions and adhesive tapes using them.

DISCLOSURE OF THE INVENTION

In order to solve the above problems, the invention as defined in claim 1 provides an acrylic emulsion obtained by preparing at least two acrylic monomer dispersions containing a tackifier dissolved at different proportions in an acrylic monomer, carrying out a polymerization reaction of one acrylic monomer dispersion and then adding the other acrylic monomer dispersion to further proceed the polymerization reaction.

The invention as defined in claim 2 provides an acrylic emulsion according to claim 1 wherein the proportion of the tackifier contained in said one acrylic monomer dispersion is lower than the proportion of the tackifier contained in said other acrylic monomer dispersion.

The invention as defined in claim 3 provides an acrylic emulsion according to claim 1 wherein the tackifier in said one acrylic monomer dispersion is based on a xylene resin contained at a weight proportion of 6% or less on the basis of the weight of the acrylic monomer in said one acrylic monomer dispersion.

The invention as defined in claim 4 provides an acrylic emulsion according to claim 3 wherein each of said acrylic monomer dispersions is an aqueous emulsion dispersion.

The invention as defined in claim 5 provides an acrylic emulsion according to claim 4 wherein the acrylic monomer in said acrylic monomer dispersions does not contain any multifunctional monomer.

The invention as defined in claim 6 provides an acrylic emulsion according to claim 1 wherein the tackifier in said one acrylic monomer dispersion is based on a rosin ester resin contained at a weight proportion of 3% or less on the basis of the total weight of said one acrylic monomer dispersion.

The invention as defined in claim 7 provides an acrylic emulsion according to claim 6 wherein each of said acrylic monomer dispersions is an aqueous emulsion dispersion.

The invention as defined in claim 8 provides an acrylic emulsion according to claim 7 wherein the acrylic monomer in said acrylic monomer dispersions does not contain any multifunctional monomer.

The invention as defined in claim 9 provides an adhesive tape comprising an adhesive layer consisting of an adhesive composition containing an acrylic emulsion according to any one of claims 1 to 8 formed on at least one face of a substrate.

The invention as defined in claim 10 provides a process for preparing an acrylic emulsion, comprising preparing at least two acrylic monomer dispersions containing a tackifier dissolved at different proportions in an acrylic monomer, carrying out a polymerization reaction of one acrylic monomer dispersion and then adding the other acrylic monomer dispersion to further proceed the polymerization reaction.

The invention as defined in claim 11 provides a process for preparing an acrylic emulsion according to claim 10 wherein the proportion of the tackifier contained in said one acrylic monomer dispersion is lower than the proportion of the tackifier contained in said other acrylic monomer dispersion.

The invention as defined in claim 12 provides a process for preparing an acrylic emulsion according to claim 10 using a xylene resin as a major component of the tackifier in said one acrylic monomer dispersion, wherein said tackifier is contained at a proportion of 6% or less on the basis of the weight of the acrylic monomer.

The invention as defined in claim 13 provides a process for preparing an acrylic emulsion according to claim 12, which uses an aqueous emulsion dispersion as each of said acrylic monomer dispersions.

The invention as defined in claim 14 provides a process for preparing an acrylic emulsion according to claim 13 wherein the acrylic monomer in each of said acrylic monomer dispersions does not contain any multifunctional monomer.

The invention as defined in claim 15 provides a process for preparing an acrylic emulsion according to claim 10 using a rosin ester resin as a major component of the tackifier in said one acrylic monomer dispersion, wherein said tackifier is contained at a proportion of 3% or less on the basis of the total weight of said one acrylic monomer dispersion.

The invention as defined in claim 16 provides a process for preparing an acrylic emulsion according to claim 15, which uses an aqueous emulsion dispersion as each of said acrylic monomer dispersions.

The invention as defined in claim 17 provides a process for preparing an acrylic emulsion according to claim 16 wherein the acrylic monomer in each of said acrylic monomer dispersions does not contain any multifunctional monomer.

According to the present invention as characterized above, an acrylic emulsion can be obtained by preparing at least two acrylic monomer dispersions containing a tackifier dissolved at different proportions in an acrylic monomer, carrying out a polymerization reaction of one acrylic monomer dispersion and then adding the other acrylic monomer dispersion to further proceed the polymerization reaction.

In FIG. 1a, the numeral reference 10 represents a container, which receives an aqueous acrylic monomer dispersion 14 containing a tackifier at a lower proportion relative to acrylic monomers.

The acrylic monomer dispersion 14 is polymerized to give particles of a higher molecular weight acrylic resin 15. When an acrylic monomer dispersion containing a tackifier at a higher proportion is added, it is dispersed as droplets 16 in the acrylic monomer dispersion 14 having undergone polymerization, as shown in FIG. 1b. In this state, particles of the higher molecular weight acrylic resin 15 have a diameter in the order of about 0.1–1 μm and the droplets 16 have a diameter in the order of about 10 to hundreds of μm. Not only the acrylic monomer but also the tackifier 17 dissolves from droplets 16 into the acrylic monomer dispersion 14 having undergone polymerization.

If the polymerization reaction is further proceeded in this state, an acrylic emulsion having a strong holding power and a high adhesion to polymer foams is obtained probably for the following reasons.

The first hypothesis holds that the acrylic monomer dissolving from the droplets 16 penetrates particles of the higher molecular weight acrylic resin 15 to form a lower molercular weight acrylic resin 18 within the acryclic resin 15, during which the tackifier 17 dissolving from the droplets 16 and present at a high concentration deposits around the higher molecular weight acrylic resin 15 to form acrylic resin particles 120, as shown in FIG. 1c. (The lower molecular weight acrylic resin 18 seems to be more or less homogenously dispersed in the higher molecular weight acrylic resin 15).

In thus formed acrylic resin particles 120, the finely divided tackifier 17 deposited on the surface is readily homogenized with acrylic resins (designated by 15, 18) during drying to increase adhesion, while the higher molecular weight acrylic resin 15 is homogenized with the lower molecular weight acrylic resin 18 to enhance holding power. Therefore, strong adhesive power and holding power can be obtained without increasing the crosslinking density with a crosslinking agent as previously.

The second hypothesis holds that acrylic resin particles 121 containing the tackifier 17 dispersed in the higher molecular weight acrylic resin 15 is formed when a lower molecular weight acrylic resin 18 is formed within particles of the higher molecular weight acrylic resin 15, as shown in FIG. 1d.

This hypothesis is identical with the first one in that the higher molecular weight acrylic resin 15 enhances holding power, but different from it in that the dispersed tackifier 17 enhances adhesion.

Any of these and other hypotheses assume that the molecular weight of the acrylic polymer becomes sufficiently high to increase holding power when an acrylic monomer containing a tackifier at a lower proportion is polymerized while a lower molecular weight acrylic polymer is produced to lower the average molecular weight when an acrylic monomer dispersion containing a tackifier at a higher proportion is polymerized, which is coupled with the presence of the tackifier at a higher concentration to improve wettability and increase adhesion.

The tackifier contained at a higher or lower proportion in each acrylic monomer dispersion seems to enhance mutual compatibility of acrylic polymers to ease formation of a homogeneous film. This may be deduced from the fact that adhesion to polyolefin materials or rough surfaces, particularly polymer foams can not be sufficiently attained with acrylic emulsions obtained by polymerizing an acrylic monomer dispersion free from tackifier.

Xylene resins are known as a suitable tackfier for urethane foams. Experiments demonstrated that acrylic emulsions prepared from a single acrylic monomer dispersion as in prior arts and using a tackifier based on a xylene resin have a strong holding power if the xylene resin is contained at a proportion of 6% or less relative to the acrylic monomer in the acrylic monomer dispersion while the holding power is lowered if the proportion exceeds 6%.

A good holding power is also obtained in the present invention using a tackifier based on a xylene resin if the weight of the xylene resin in an acrylic monomer dispersion containing the tackifier at a relatively low proportion among a plurality of acrylic monomer dispersions containing the tackifier at different proportions is 6% or less on the basis of the weight of the acrylic monomer in said acrylic monomer dispersion, as demonstrated by the experimental results described later.

When the tackifier is based on a rosin ester resin (disproportionating rosin ester), however, it was observed that even acrylic emulsions obtained by polymerizing a single acrylic monomer dispersion as in prior arts have a lowered holding power if it is contained at a proportion above 3% because of the high chain transfer ability (polymerization-inhibiting ability) of the rosin ester.

Therefore, when one of acrylic monomer dispersions contains a tackifier based on a rosin ester resin according to the present invention, an acrylic monomer dispersion containing the tackfier at a relatively low proportion among acrylic monomer dispersions containing it at different proportions should desirably contain the tackifier at a proportion of 3% or less on the basis of the weight of the acrylic monomer in said acrylic monomer dispersion.

The present invention is suitable for aqueous acrylic emulsions, but also applicable to acrylic emulsions partially containing organic solvents.

BRIEF DESCRIPTION OF THE DRAWINGS

FIG. 3 is a diagram for illustrating a method for determining adhesion to urethane;

FIGS. 4a–4c are diagrams for illustrating a method for determining holding power.

THE MOST PREFERRED EMBODIMENTS OF THE INVENTION

Monomer composition

Figure 1A:
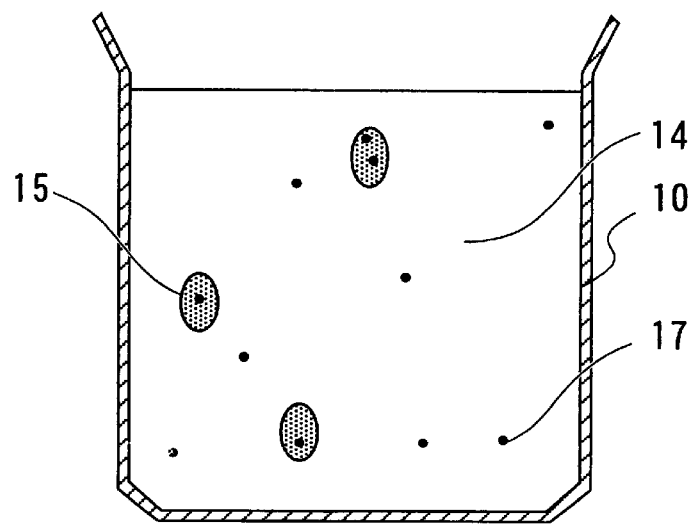
FIGS. 1a–1d are diagrams for illustrating growth state of an acrylic resin in an acrylic emulsion according to the present invention.
Figure 1B:
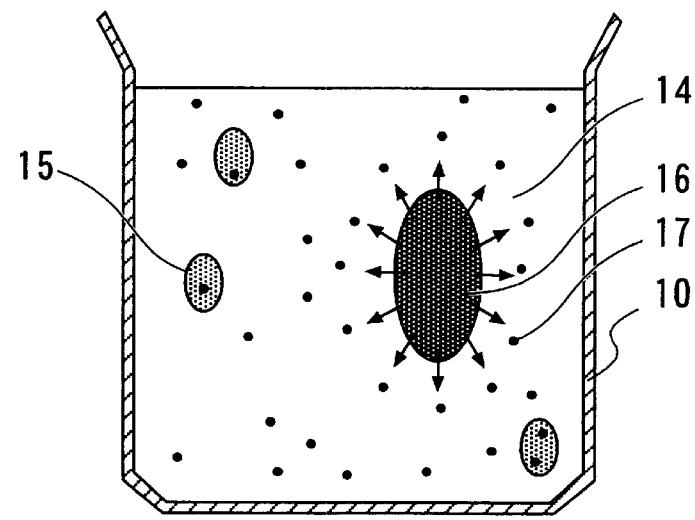
Figure 1C:
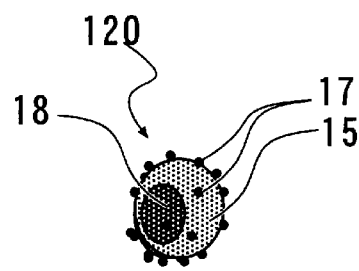
Figure 1D:
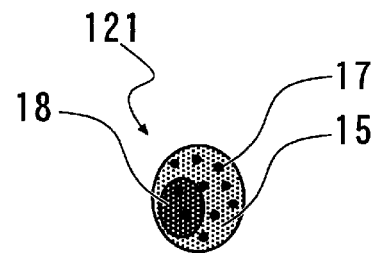

Acrylic monomers which can be used in the present invention include the following monomers (a) to (d).

(a): One or several (meth) acrylic ester monomers having a straight or branched C2–10 alkyl group.

These monomers are acrylic esters or methacrylic esters commonly used in adhesives and representative examples thereof include ethyl acrylate, propyl acrylate, butyl acrylate, amyl acrylate, hexyl acrylate, 2-ethylhexyl acrylate, octyl acrylate, nonyl acrylate, decyl acrylate and their corresponding methacrylates.

These monomers are selected mainly taking into account the Tg of the resulting polymer. Namely, they are preferably selected so that the Tg of the final polymer should preferably be −20° C. or less. The proportion is desirably 98–60% by weight on the basis of the total weight of acrylic monomers.

(b): Ethylenically unsaturated monomers copolymerizable with said monomers (a).

These monomers are a group of monomers used as a component conferring cohesive force and include, for example, methacrylates and acrylates giving a polymer with Tg of 0° C. or more such as methyl methacrylate, isobornyl methacrylate, cyclohexyl acrylate, benzyl methacrylate; vinyl esters such as vinyl acetate; vinyl ethers; vinyl cyanides such as acrylonitrile; vinyl halides such as vinyl chloride; styrene derivatives such as styrene, methylstyrene, chlorostyrene. The proportion is desirably 0–38% by weight on the basis of the total weight of acrylic monomers.

(c): Ethylenic monomers having a carboxylate group.

Examples of these monomers include methacrylic acid, acrylic acid, itaconic acid, fumaric acid, maleic acid and (meth)acrylates having a carboxyl group. Among them, methacrylic acid and acrylic acid are especially preferred.

The proportion of ethylenic monomers having a carboxylate group is desirably 2–10% by weight on the basis of the total weight of acrylic monomers, more preferably 3.5–10% by weight.

(d): Crosslinkable monomers

These monomers include multifunctional monomers having 2 to 6 functionalities and GMA (glycidyl methacrylate).

If these crosslinkable monomers are incorporated at a typical ratio, the crosslinking density increases to impair wettability and therefore adhesion to polyolefin materials or rough surfaces, particularly polymer foams.

However, they may be added in an amount that may not affect adhesion, if the holding power of the final adhesive should be somewhat improved. Such a level is less than 1.0% by weight on the basis of the total weight of acrylic monomers, more preferably 0.3% by weight or less.

Types of tackifiers

Tackifiers are added into adhesives to enhance adhesion. Typical tackifiers are one or more selected from the list given at pages 100–101 of Adhesive Handbook ($2^{nd}$ edition, Japan Adhesive Tape Industry Association), among which the types with a good compatibility for acrylic emulsion polymers are suitable for the present invention. Examples include rosin ester resins, terpene phenol resins, xylene resins, chroman/indene resins, C9 petroleum resins, etc.

Their softening point is not critical, but preferably they are liquid at 150° C. or less to room temperature. Tackifiers having different softening points or of different types may be used as a mixture, or may be used separately for different monomer sites.

Method for adding tackifiers

According to the present invention, tackifiers are preferably added into the reaction system in such a manner that they may be homogeneously dispersed in monomer oil droplets or micelles during emulsion polymerization reaction of acrylic monomers.

Specifically, one of such most convenient and effective means consists in adding a tackifier preliminarily dissolved in an acrylic monomer into the reaction system by a known feeding method for emulsion polymerazation.

The present invention may involve polymerizing any one of two or more acrylic monomer dispersions containing a tackifier dissolved therein at different proportions, then successively adding the other acrylic monomer dispersions to the reaction system to proceed the emulsion polymerazation.

Here, each acrylic monomer dispersion may contain a different type of tackifier or a mixture of different types of tackifiers.

However, the chain transfer ability varies with the type of tackifier, i.e. tackifiers having higher chain transfer ability inhibit polymerization reaction to a greater extent. Thus, an optimal content level varies with the type of tackifiers.

Excessive tackifiers give only acrylic resins having a low molecular weight with insufficient holding power, while too less tackifiers can not give a homogeneous coating film because a higher molecular weight acrylic resin and a lower molecular weight acrylic resin are hardly mixed with each other during drng. As a result, a sufficient adhesion to polyolefin materials or rough surfaces, particularly polymer foams will not be obtained.

When a tackifier based on a xylene resin is contained at different proportions in two or more acrylic monomer dispersions, an optimal content should be controlled at a xylene resin proportion of 6% or less, desirably 5% or less but 0.5% or more in at least one acrylic monomer dispersion on the basis of the weight of the acrylic monomer in said acrylic monomer dispersion.

When the tackifier is based on a disproportionating rosin ester resin, the proportion of the tackifier in at least acrylic monomer dispersion should be controlled at 3% or less, desirably 3% or less but 0.3% or more on the basis of the weight of the acrylic monomer in said acrylic monomer dispersion.

In order for a higher molecular weight acrylic resin to sufficiently exhibit holding power, the acrylic monomer in an acrylic monomer dispersion containing a tackifier at a lower proportion may exist at a proportion of 5–95% relative to the total of acrylic monomers.

When a tackfier is to be contained at a higher proportion, it may exist at a weight proportion of up to a maximum of 100% on the basis of the weight of the acrylic monomer in the acrylic monomer dispersion.

Total level of tackifiers

In addition to the proportion of tackfiers in each acrylic monomer dispersion as explained in the above, the proportion of tackifiers relative to the total of acrylic monomers is also important. Thus, the total weight of tackifiers according to the present invention is preferably 5–50% on the basis of the total weight of acrylic monomers.

If tackfiers are added at a proportion of less than 5%, good adhesion can not be obtained to polyolefin materials or rough surfaces, particularly polymer foams so that any improving effect by addition of tackifiers is not observed.

If tackifiers are added at a proportion of 50% or more, tack or cohesive force is lowered and characteristic balance for adhesives is deteriorated.

Emulsion polymerization techniques

Acrylic emulsions of the present invention can be prepared by known emulsion polymerization techniques except for addition of a tackifier.

Stepwise addition of acrylic monomer dispersions may readily provide a stable acrylic emulsion by using an acrylic monomer dispersion containing a tackifier at the least level as the acrylic monomer dispersion to be initially polymerized.

However, this may not be always necessary, but an acrylic monomer dispersion containing a tackifier at an appropriate proportion may be initially polymerized so far as polymerization stably proceeds.

The acrylic monomer dispersion to be initially polymerized may be polymerized at once or partially prepolymerized to form a particle nucleus and subsequently the remainder may be added dropwise or stepwise to proceed the polymerization reaction.

An acrylic monomer dispersion containing a tackifier at a different proportion may be added dropwise directly to an acrylic monomer dispersion having undergone polymerization reaction (dropwise addition of a monomer) or may be added after having been emulsified with a surfactant (dropwise addition of an emulsified monomer).

The acrylic monomer dispersion containing a tackifier at a different proportion is preferably added after the polymerization reaction of the acrylic monomer dispersion to be initially polymerized has already been terminated.

Power-feeding method may be used to proceed polymerization reaction while continuously changing the concentration of the tackifier in the acrylic monomer dispersion to be added.

As explained in the above, an acrylic monomer dispersion containing a tackifier at a different proportion may be stepwise or continuously added to an acrylic monomer dispersion having undergone polymerization reaction. Any combination of a stepwise method and a continuous method or other methods are also included in the present invention.

Surfactants and initiators

Surfactants can be appropriately selected from those known to be suitable for polymerization of acrylic monomers and commonly used. They may be added typically at a proportion of 0.5% or more but 8% or less, preferably in a narrower range, specifically 1% or more but 4% or less on the basis of the total weight of acrylic monomers.

Suitable types of surfactants include reactive, anionic, nonionic, anion-nonionic or other types, which may be used alone or in combination of two or more types. These surfactants may be dissolved in either water or acrylic monomer phase. They may be dispensed and dissolved in an appropriate amount into each of water and acrylic monomer phases. When monomers are preliminarily emulsified, these emulsifiers may be totally or partially used for this purpose and the remainder may be dissolved in water phase.

Suitable initiators include aqueous persulfates such as KPS (potassium persulfate) or APS (ammonium persulfate). They may be used in a redox system.

The amount of initiators may be typically chosen in the range of 0.05 to 1.0% by weight. These initiators may be dissolved in water phase or monomers preliminarily emulsified. They may be dispensed and dissolved in an appropriate amount into each of water and emulsified monomer phases.

Solids

Preferably, solid content of acrylic emulsions of the present invention is typically 30% by weight or more but 70% by weight or less. A preferred solid content ranges from 45% by weight to 70% by weight. Within this range, suitable viscosity characteristics for coating are readily obtained as well as convenient effects for drying time.

Additives

Acrylic emulsions of the present invention can be directly coated on a substrate to prepare an adhesive tape. Various additives may be added to prepare an adhesive composition. Moreover, such an adhesive composition can be coated on or transferred to a substrate to prepare an adhesive tape.

Acrylic emulsions of the present invention may include additives such as thickeners, antifoamers, leveling agents, which can be added in an appropriate amount to improve coating characteristics. Other additives include tackifiers for water dispersion, film-forming aids, plasticizers, softening agents, crosslinking agents, other acrylic emulsions, etc., which can be added in an appropriate amount that does not affect characteristics of emulsions of the present invention to control the balance of adhesive characteristics.

A large amount of aqueous crosslinking agents as additives unpreferably deteriorate adhesion, but they may be added in an amount that limits the loss of adhesion to a lesser extent. Such aqueous crosslinking agents include Aquanate available from Nippon Polyurethane Industry, Elastlon BN available from Dai-ichi Kogyo Seiyaku, Carbolite available from Nisshinbo Industries, etc. The weight of additives to be added is less than 1.0%, preferably 0.3% or less on the basis of the weight of the acrylic resin.

Coating

Acrylic emulsions and compositions thereof according to the present invention can be coated on a substrate made from a film, paper, cloth or non-woven fabric using a typical roll coater, knife coater, comma coater, fountain coater or the like and dried to prepare an adhesive tape. Similarly, they can be coated on a release paper and dried, and then transferred onto a substrate to prepare a double-side adhesive tape. Alternatively, a core material can be dipped in an acrylic emulsion or an adhesive composition thereof according to the present invention, then dried to prepare a double-side adhesive tape.

Acrylic emulsions and composition thereof according to the present invention can be used as a contact adhesive, which is coated on one or both of adherends such as construction materials, interior materials, heat-insulating materials, wall materials, dried and then said adherends are contact-bonded to each other. Such contact adhesives containing no additives are included in acrylic emulsions of the present invention, and those with additives are included in adhesive compositions of the present invention.

Adhesion to urethane

Figure 2A:
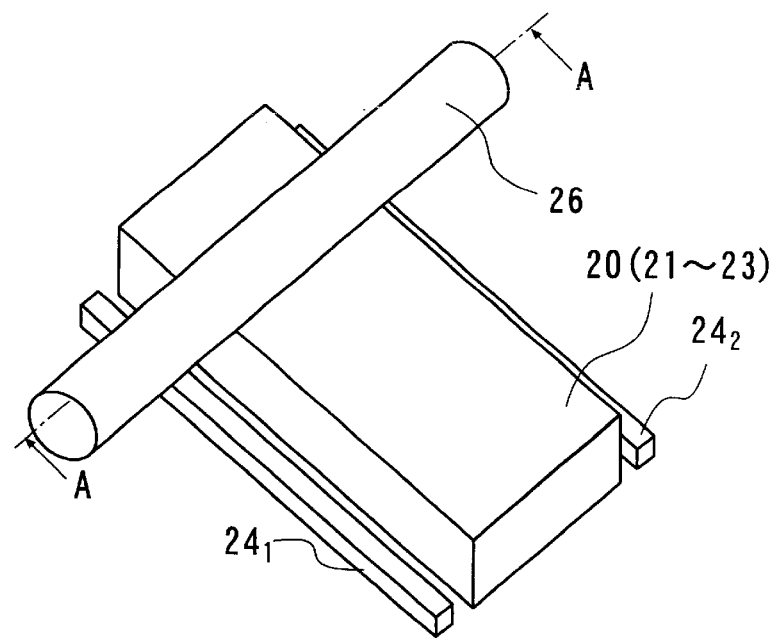
FIGS. 2a–2c are diagrams for illustrating a process for preparing a test piece for determining adhesion to urethane.
Figure 2B:
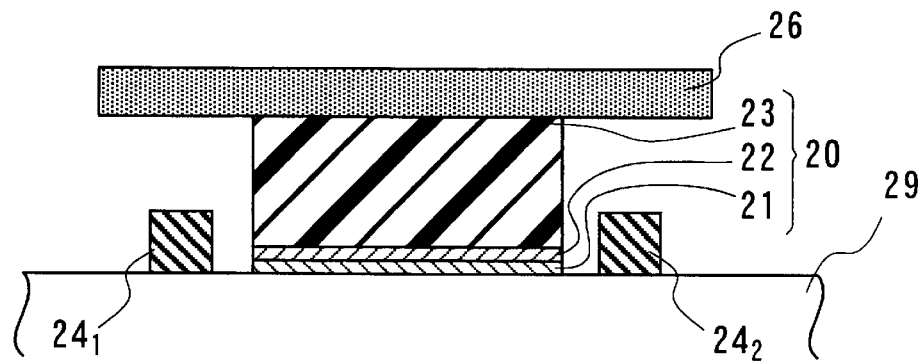

Adhesion to urethane represents adhesion to materials that are difficult to adhere. As shown in FIG. 2b, a test piece 20 is formed by preparing a polyester film 21, an adhesive tape 22 and an adherend 23 each cut into a width of 20 mm and provisionally bonding the polyester film 21 and the adherend 23 flushed on both transversal edges with the adhesive tape 22.

The test piece 20 is mounted on a test table 29 with the polyester film 21 facing the table, and spacers $24_1$, $24_2$ are placed on both transversal edges, then a roller 26 is applied on the adherend 23 of the test piece 20. FIG. 2a is a perspective view showing this arrangement, and FIG. 2b is a sectional view taken along A—A line of FIG. 2a.

As the adherend 23, two types of materials, i.e. commercially available polyester urethane foam (open cells with a density of 0.031) and polyether urethane foam (open cells with a density of 0.022) of 5 mm in thickness were used. The total thickness of the polyester film 21 and the adhesive tape 22 is 0.15–0.2 mm. The spacers $24_1$, $24_2$ have a thickness of 1.2 mm.

Figure 2C:
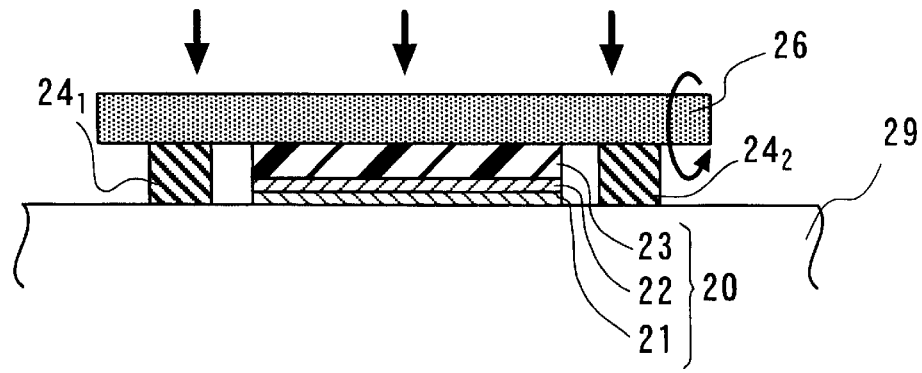

When the roller 26 is pressed against the spacers $24_1$, $24_2$ at both ends and rolled for one reciprocation as shown in FIG. 2c, the adherend 23 is pressed against the adhesive tape 22 at 80% compression.

Then, the test piece was left with the polyester film 21 upward on the test table 29 at room temperature for 24 hours, and then pulled at a speed of 100 mm/min. using a Tensilon-type tensile tester as shown in FIG. 3 to measure the force needed at that time (the stress during T-type 90° peeling).

Holding power

As shown in FIGS. 4a and 4b, a double-side adhesive tape 30 and a polyester film 31 each having a width of 25 mm are arranged in this order on a stainless plate 33, and slit at an end 38 in such a manner that the stainless plate 33 and the double-side adhesive tape 30 may be subjected to stress over a contact area of 25×25 $mm^2$. FIG. 4b corresponds to a sectional view taken along B—B line of FIG. 4a.

Then, a roller of a contact-bonding apparatus (motorized contact-bonding apparatus made by Toyo Seiki) is applied on the polyester film 31 and rolled for one reciprocation under the conditions of a load of 19.61±0.49 N (2000±50 g) and a contact-bonding speed of 300 mm/min. Then, a load of 1 kg was applied on the polyester film 31 on the stainless plate 33 vertically fixed in an atmosphere at 40° C.

FIG. 4c shows that the polyester film 31 has slipped by the load. The holding power of the polyester film 31 which has not dropped after the lapse of 60 minutes is expressed by slippage S (this slippage S is a distance between the unloaded remainder 31' of the polyester film and the loaded polyester film 31), while the holding power of the polyester film which has dropped before the lapse of 60 minutes is expressed by the time before it dropped.

Good holding power of adhesives prepared from acrylic emulsions and compositions thereof according to the present invention means that the time before dropping is 60 minutes or more and slippage S ranges from 0.1 mm to 25 mm, more preferably 0.1 mm to 10 mm according to the above definition of holding power.

Flexibility

Figure 5A:
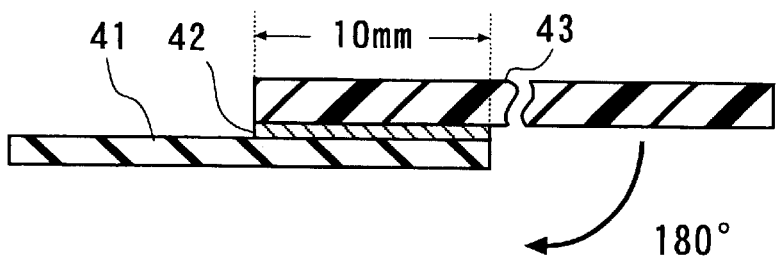
FIGS. 5a–5e are diagrams for illustrating a method for determining flexibility.

At first, as shown in FIG. 5a, an aluminium plate 41 having a thickness of 0.5 mm is prepared together with a double-side adhesive tape 42 and an adherend 43 (polyester urethane foam or polyether urethane foam of 5 mm in thickness) each cut into a width of 20 mm, and the aluminium plate 41, adhesive tape 42 and adherend 43 are arranged in this order with the transversal side edges of the double-side adhesive tape 42 and the adherend 43 being flushed so that the double-side adhesive tape 42 may be in contact with the aluminium plate 41 over a length of 10 mm.

Then, a roller was applied on the adherend 43 and rolled for one reciprocation through spacers of 1.2 mm in thickness under the same conditions as explained for "adhesion to urethane" (80% compression).

Then, the test piece was left with the aluminium plate 41 upward at room temperature for 24 hours, and the part of the adherend 43 extending over an end of the aluminium plate 41 was turned back by 180° and fixed to the aluminium plate 41 with the double-side adhesive tape 45.

Figure 5B:
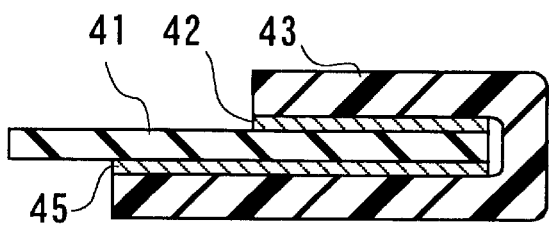

FIG. 5b shows this state. After the test piece was left at room temperature for 24 hours, floating of the part of the adherend 43 contact-bonded by the roller (distance between an end of the adherend 43 and the double-side adhesive tape 42) was measured.

Figure 5C:
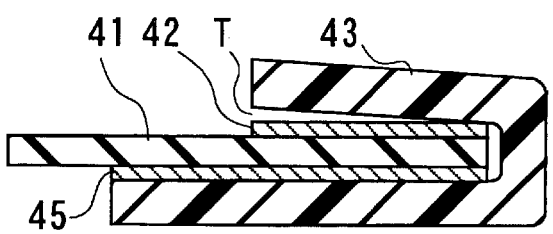
Figure 5D:
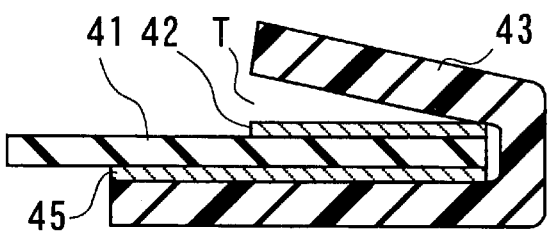
Figure 5E:
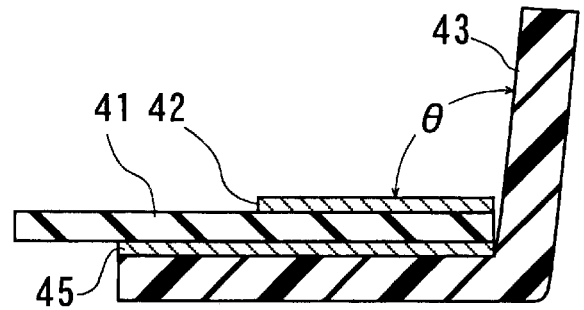

The symbol T in FIGS. 5c and 5d designates the amount of floating. FIG. 5c shows an excellent floating T of less than 2 mm, FIG. 5d shows a good floating T in the range of 2 mm to 10 mm, and FIG. 5e shows failure wherein floating T exceeds 10 mm with the angle θ being 90° or more.

Synthesis Example 1

In a mixture of 2-ethyihexyl acrylate (51.8 g), ethyl acrylate (32.8 g) and methacrylic acid (5.4 g) was dissolved 2.64 g of a straight xylene resin H (Mitsubishi Gas Chemical) (in the proportion of 2.93% on the basis of the weight of acrylic monomers; the proportions of tackifiers will be hereinafter expressed on the weight of acrylic monomers) to prepare a monomer solution.

Separately, surfactants (3.0 g of Newcol 707SF and 1.91 g of Newcol 271A available from Nippon Nyukazai) and then 0.45 g of APS (ammonium persulfate) were dissolved in ion exchanged water (73 g).

The above monomer solution was added and dispersed in emulsion using a homogenizer to prepare acrylic monomer dispersion A.

The exactly same procedure was followed except that the amount of xylene resin H was 15.2 g (16.89%) to prepare acrylic monomer dispersion B.

In a 1-liter separable flask, 74 g of ion exchanged water and a part of acrylic monomer dispersion A (1/10 of acrylic monomer dispersion A) were introduced and heated to 80° C. with stirring under nitrogen stream, thereby the reaction solution turned bluish, indicating the start of a polymerization reaction.

Then, the remainder (9/10) of acrylic monomer dispersion A was added dropwise into the reaction system with a tube pump over 90 minutes (first stage polymerization).

After completion of dropwise addition of the remainder, acrylic monomer dispersion B was subsequently added dropwise into the reaction system over 100 minutes (second stage polymerization). After completion of dropwise addition, stirring was continued at the same temperature for 2 hours, then the reaction solution was cooled to room temperature to quench the reaction. Then, the reaction solution was neutralized with ammonia water to pH 6–7, then filtered through a 100-mesh wire cloth to give a milky acrylic emulsion containing xylene resin.

This acrylic emulsion was coated on a silicone release paper with a knife coater and dried in an oven at 80° C. for about 10 minutes. Then, this adhesive was transferred to both faces of a non-woven fabric substrate having a density of 14 g/m² to prepare a double-side adhesive tape having a total thickness of 130 µm.

This adhesive film was tested for holding power, adhesion to urethane foams and flexibility, and the results are shown in the following table 1.

acrylic monomers. The other conditions were exactly the same as those of Synthesis example 1 to prepare an acrylic emulsion.

This acrylic emulsion was coated on a PET film (polyester film) having a thickness of 25 µm and dried at 100° C. for 5 minutes to prepare a single-side adhesive tape. The evaluation results of its characteristics are shown in the above Table 1.

As compared with Synthesis example 1, adhesion to urethane changed from AF (adhesive failure) to CF (cohesive failure) and holding power was also slightly lowered. This proved that a higher proportion of xylene resin in the acrylic monomer dispersion to be polymerized during the first stage tends to lower cohesive force. However, this performance still remained satisfactory for practical use.

Synthesis Example 3

An acrylic emulsion was prepared under the exactly same conditions as those of Synthesis example 1 except that rosin ester KE364c (ARAKAWA CHEMICAL INDUSTRIES) was contained at a proportion of 1.47% in place of xylene resin in acrylic monomer dispersion A in Synthesis example 1, and subsequently a double-side adhesive tape was prepared therefrom and evaluated. Evaluation results are shown in the above Table 1.

As apparent from Table 1, the double-side adhesive tape of this Synthesis example 3 shows excellent adhesion to

TABLE 1

Characteristics of acrylic emulsions synthesized by two step addition of a tackifier

| | Loading proportion of tackifier (×1/100) | | | Weight ratio of solutions A and B | Film | Adhesion to Urethane | Adhesion to Urethane | Holding | |
|---|---|---|---|---|---|---|---|---|---|
| | Solution A | Solution B | Average | First stage: Second stage | thickness µm | foam (1) (g/2 cm)[*5] | foam (2) (g/2 cm)[*5] | power (mm) | Flexibility Appearance |
| Example 1 | 2.93 | 16.89 | 9.91 | 50/50 | 130 | 190(AF)[*5] | 150(AF)[*6] | 0.9 | Excellent |
| Example 2 | 5.95 | 13.88 | 9.91 | 50/50 | 57[*2] | 160(CF)[*7] | 140(CF)[*7] | 25 | —[*3] |
| Example 3 | 1.47[*1] | 16.89 | 9.18 | 50/50 | 120 | 230(CF)[*7] | 230(CF)[*7] | 8 | Good |
| Example 4 | 2.93 | 9.91 | 6.42 | 50/50 | 125 | 180(AF)[*6] | 120(AF)[*6] | 0.8 | Excellent |
| Example 5 | 2.93 | 16.89 | 6.42 | 75/25 | 130 | 230(AF)[*6] | 120(AF)[*6] | 1.2 | Excellent |

[*1]Disproportionating rosin ester  [*2]Single-side adhesive tape
[*3]Non-evaluatable because of a sample of a single-side adhesive tape
[*5]Stress during T-type 90° peeling of a test piece having a width of 2 cm bonded to urethane foam
[*6]AF = adhesive failure  [*7]CF = cohesive failure
Solution A: Acrylic monomer dispersion A
Solution B: Acrylic monomer dispersion B
Adhesion (1): to a polyester urethane foam
Adhesion (2): to a polyether urethane foam As apparent from the above table, the adhesive tape of this Synthesis example 1 was good in all of adhesion, holding power and flexibility.

Synthesis Example 2

The proportion of xylene resin in acrylic monomer dispersion A in Synthesis example 1 was increased to 5.95% while the proportion of xylene resin in acrylic monomer dispersion B was decreased to 13.88%. Here, the total amount of xylene resin in acrylic monomer dispersion A and acrylic monomer dispersion B is unchanged from 9.91% of Synthesis example 1 on the basis of the total weight of urethane. This proves that rosin ester has a comparable effect at a lower proportion than xylene resin added as a tackifier in the acrylic monomer dispersion used for the first stage polymerization.

Synthesis Example 4

The proportion of xylene resin in acrylic monomer dispersion B in Synthesis example 1 was decreased to 9.91% while the concentration of xylene resin in acrylic monomer dispersion A was unchanged. Here, the total weight of xylene resin on the basis of the total weight of acrylic monomers is 6.42%.

The other conditions were the same as those of Synthesis example 1 to prepare an acrylic emulsion, from which a double-side adhesive tape was subsequently prepared and evaluated. Evaluation results are shown in the above Table 1.

Adhesion to urethane was slightly lowered to AF mode, but still remained within a satisfactory range, while holding power and flexibility were very good.

Synthesis Example 5

The weight of acrylic monomer dispersion A in Synthesis example 1 was increased by 50% while the weight of acrylic monomer dispersion B was decreased to a half, so that the weight ratio between acrylic monomer dispersion A and acrylic monomer dispersion B was 75:25.

The total weight of xylene resin was 6.42% on the basis of the total weight of acrylic monomers.

An acrylic emulsion was prepared under the same conditions as those of Synthesis example 1, and subsequently a double-side adhesive tape was prepared therefrom and evaluated. Evaluation results are shown in Table 1. All of adhesion to urethane, holding power and flexibility were good.

Synthesis Example 6

Three acrylic monomer dispersions A to C containing xylene resin at weight proportions of 2.93%, 9.91% and 16.89%, respectively were prepared. The weight ratio of acrylic monomer dispersions A to C was 33:33:33. Here, the total amount of xylene resin is 9.91%.

After two acrylic monomer dispersions A and B among A to C were polymerized under the same conditions as those of Synthesis example 1, acrylic monomer dispersion C containing xylene resin at the highest proportion was added to said polymer solution and polymerized.

In this way, acrylic monomer dispersions A to C containing xylene resin at different proportions were polymerized in 3 stages to prepare an acrylic emulsion, then a double-side adhesive tape was similarly prepared therefrom and evaluated. Evaluation results are shown in the following Table 2.

As apparent from Table 2, all of adhesion to urethane, holding power and flexibility were good.

Synthesis Example 7

An acrylic emulsion was prepared by 3-stage polymerization similarly to Synthesis example 6 except that the amounts of xylene resin contained in acrylic monomer dispersion B and acrylic monomer dispersion C were 16.89% and 39.73%, respectively and the proportion of the total weight of xylene resin was 19.85%, and subsequently a double-side adhesive tape was prepared therefrom and evaluated.

The results are shown in the above Table 2. As apparent from Table 2, holding power is somewhat lower but still represents 60 minutes or more to satisfy the minimum performance level for practical use. However, adhesion to urethane was very excellent and flexibility was also good.

Synthesis Example 8

Acrylic monomer dispersions A and B were prepared in the exactly same manner as in Synthesis example 1, and 74 g of ion exchanged water and a part (1/10) of acrylic monomer dispersion A were introduced into a 1-liter separable flask and heated to 80° C. with stirring under nitrogen stream, thereby the reaction solution turned bluish, indicating the start of a polymerization reaction.

Then, acrylic monomer dispersion B was continuously added to the remainder (9/10) of acrylic monomer dispersion A with a tube pump to prepare a mixed solution, which was continuously added dropwise into said polymerization reaction system of acrylic monomer dispersion A with another tube pump at a constant speed over 180 minutes.

The ratio between the addition speed of acrylic monomer dispersion B to the remainder of acrylic monomer dispersion A and the addition speed of the mixed dispersion into the reaction system of acrylic monomer A was set at 1:1.9 so that both additions were completed at the same time.

After completion of these additions, stirring was continued at the same temperature for further 2 hours, then the reaction solution was cooled to room temperature to quench the reaction. Then, the reaction solution was neutralized

TABLE 2

Characteristics of acrylic emulsions polymerized by three-step addition or power-feeding of a tackifier

| | | Loading proportion of tackifier (×1/100) | | | Weight ratio of solutions A, B and C | Film thickness μm | Adhesion to Urethane foam (1) (g/2 cm)(*5) | Adhesion to Urethane foam (2) (g/2 cm)(*5) | Holding power (mm) | Flexibility Appearance |
|---|---|---|---|---|---|---|---|---|---|---|
| | | Solution A | Solution B | Solution C | Average | | | | | |
| Example 6 | 3-step addition | 293 | 9.91 | 16.89 | 9.91 | 33/33/33 | 130 | 190(AF)(*6) | 130(AF)(*5) | 1.0 | Excellent |
| Example 7 | 3-step addition | 293 | 16.89 | 39.73 | 19.85 | 33/33/33 | 130 | 270(CF)(*7) | 300(CF)(*7) | 63 (min) | Excellent |
| Example 8 | PF(*4) | | 293~16.89 | | 9.91 | Continuously varied | 120 | 170(AF)(*6) | 170(AF)(*6) | 1.8 | Good |

(*4)Power feeding
(*5)Stress during T-type 90° peeling of a test piece having a width of 2 cm bonded to urethane foam
(*6)AF = adhesive failure  (*7)CF = cohesive failure
Solution A: Acrylic monomer dispersion A
Solution B: Acrylic monomer dispersion B
Solution C: Acrylic monomer dispersion B
Adhesion (1): to a polyester urethane foam
Adhesion (2): to a polyether urethane foam with ammonia water to pH 6–7, then filtered through a 100-mesh wire cloth to give a milky acrylic emulsion. A double-side adhesive tape was prepared and evaluated in the same manner as in Synthesis example 1. Evaluation results are shown in Table 2. All of adhesion to urethane, holding power and flexibility were good.

Now, Comparative examples and Reference examples are described.

Comparative Examples 1–3

Acrylic emulsions were prepared in the same manner as in Synthesis example 1, but using acrylic monomer dispersions A and B containing xylene resin at the same proportion.

The tackifier is contained at a proportion of zero (no tackifier is contained) in Comparative example 1, 2.93% in Comparative example 2, and 4.96% in Comparative example 3. The results are shown in the following Table 3.

Comparative Example 5

An acrylic emulsion was prepared in the same manner as in Synthesis example 1 except that acrylic monomer dispersions A and B contain xylene resin at a proportion of 16.78% (the same value as the proportion in acrylic monomer dispersion B in Synthesis example 1).

As compared with the adhesive tape of Comparative example 4, both of adhesion and holding power were lowered to a more unsuitable level for practical use.

The results of the foregoing Comparative examples 1 to 5 proved that even stepwise polymerization of acrylic monomer dispersions containing a tackifier at the same proportion which may improve adhesion to urethane considerably impairs holding power and fails to obtain flexibility. Namely, the three characteristics were not satisfactorily balanced in acrylic emulsions prepared from acrylic monomer dispersions containing a tackifier at the same proportion, adhesive compositions using said acrylic emul-

TABLE 3

Characteristics of emulsions synthesized by homogeneous addition of a tackifier

|  | Loading proportion of tackifier (×(1/100)) Average | Film thickness $\mu m$ | Adhesion to Urethane foam(1) (g/2 cm)(*5) | Adhesion to Urethane foam(2) (g/2 cm)(*5) | Holding power (mm) | Flexibility Appearance |
|---|---|---|---|---|---|---|
| Comparative example 1 | Not added | 110 | 80(AF)(*6) | 30(AF)(*6) | 0.1 | Failure (AF)(*6) |
| Comparative example 2 | 2.93 | 115 | 110(AF)(*6) | 60(AF)(*6) | 0.4 | Failure (AF)(*6) |
| Comparative example 3 | 4.96 | 110 | 125(AF)(*6) | 110(AF)(*6) | 2.5 | Failure (AF)(*6) |
| Comparative example 4 | 9.91 | 122 | 300(CF)(*6) | 300(CF)(*7) | 6 min 10 sec | (CF)(*7) |
| Comparative example 5 | 16.88 | 130 | 220(CF)(*7) | 229(CF)(*7) | 2 min 50 sec | Failure (CF)(*7) |

(*5)Stress during T-type 90° peeling of a test piece having a width of 2 cm bonded to urethane foam
(*6)AF = adhesive failure   (*7)CF = cohesive failure
Adhesion (1): to a polyester urethane foam
Adhesion (2): to a polyether urethane foam As apparent from the above Table 3, Comparative examples 1 to 3 showed good holding power, but quite unsatisfactory adhesion to urethane and flexibility.

As the proportion of xylene resin used as a tackifier increased, adhesion to urethane was gradually improved but still remained in AF failure mode and did not reach any satisfactory level. Flexibility was not improved at all, and holding power was gradually lowered.

Comparative Example 4

An acrylic emulsion was prepared in the same manner as in Synthesis example 1 except that acrylic monomer dispersions A and B contain xylene resin at a proportion of 9.91% (the same value as the proportion of the total weight in Synthesis example 1).

Adhesion to urethane changed from AF failure mode to CF failure mode to give excellent adhesion, but holding power was extremely lowered to a wholly unsuitable level for practical use (6 min. 40 sec.).

sions and adhesive tapes using said acrylic emulsions or adhesive compositions.

Comparative Example 6

Acrylic monomer dispersion A containing no tackifier and acrylic monomer dispersion B containing xylene resin at a proportion of 19.82% were prepared. Here, the weight of xylene resin represents 9.91% of the total weight of acrylic monomers.

The other conditions were the same as those of Synthesis example 1 to prepare an acrylic emulsion, and subsequently a double-side adhesive tape was prepared therefrom and evaluated. The results are shown in the following Table 4.

TABLE 4

Characteristics of acrylic emulsions synthesized
by addition of a tackifier only at the second stage

| | Loading proportion of tackifier (×1/100) | | | Weight ratio of solutions A and B | Film | Adhesion to Urethane | Adhesion to Urethane | Holding | |
|---|---|---|---|---|---|---|---|---|---|
| | Solution A | Solution B | Total | Solution A: Solution B | thickness μm | foam(1) (g/2 cm)[*5] | foam(2) (g/2 cm)[*5] | power (mm) | Flexibility Appearance |
| Comparative example 6 | 0.00 | 19.82 | 9.91 | 50/50 | 130 | 70 | 50 | 0.3 | Failure (AF)[*6] |

[*5]Stress during T-type 90° peeling of a test piece having a width of 2 cm bonded to urethane foam
[*6]AF = adhesive failure
Solution A: Acrylic monomer dispersion A
Solution B: Acrylic monomer dispersion B
Adhesion (1): to a polyester urethane foam
Adhesion (2): to a polyether urethane foam As apparent from Table 4, holding power is good, but adhesion to urethane is low and flexibility is also unsuitable for practical use. Thus, no improvement was observed in adhesion to urethane when no tackifier was added to acrylic monomer dispersion A used for the first stage polymerization reaction.

The following Reference examples illustrate cases using rosin ester resin as a tackifier.

Reference Example 1

In a mixture of 2-ethylhexyl acrylate (82 g), vinyl acetate (15 g) and acrylic acid (3 g) was dissolved 3.1 g (3.1%) of rosin ester KE364c (ARAKAWA CHEMICAL INDUSTRIES) to prepare a monomer solution.

Separately, surfactants (3.33 g of Newcol 707SF and 2.13 g of Newcol 271A available from Nippon Nyukazai) and then 0.5 g of APS (ammonium persulfate) were dissolved in ion exchanged water (83 g). The above monomer solution was added and dispersed in emulsion using a homogenizer to prepare acrylic monomer dispersion A.

In a 1-liter separable flask, 36 g of ion exchanged water and a part of said acrylic monomer dispersion A (36 g) were introduced and heated to 80° C. with stirring under nitrogen stream to start a reaction. The reaction solution turned bluish, indicating the start of a polymerization reaction.

Then, the remainder of acrylic monomer dispersion A was added dropwise into the reaction system of said acrylic monomer A with a tube pump over 120 minutes. After completion of addition, stirring was continued at the same temperature for further 2 hours, then the reaction solution was cooled to room temperature to quench the reaction.

The resulting solution was neutralized with ammonia water to pH 6–7, then filtered through a 100-mesh wire cloth to give a milky acrylic emulsion.

This acrylic emulsion was coated on a silicone release paper with a knife coater and dried in an oven at 80° C. for about 10 minutes to give a dry coating film. Then, this dry coating film was transferred to a polyester film of 25 μm to prepare a single-side adhesive tape.

Characteristics of this adhesive tape are shown in the following table 5.

TABLE 5

Characteristics of acrylic emulsions synthesized
by addition of rosin ester KE 364c

| | Loading proportion of tackifier (% monomer) Total | Film thickness μm | Adhesion to Urethane foam(1) (g/2 cm)[*5] | Adhesion to Urethane foam(2) (g/2 cm)[*5] | Holding power | Flexibility Appearance |
|---|---|---|---|---|---|---|
| Reference example 1 | 3.1 | 55[*2] | — | 75(CF)[*7] | 0.25 | — |
| Reference example 2 | 5.3 | 60[*2] | — | 25(CF)[*7] | 6 min | — |

[*2]Single-side adhesive tape
[*5]stress during T-type 90° peeling of a test piece having a width of 2 cm bonded to urethane foam
[*7]CF = cohesive failure
Solution A: Acrylic monomer dispersion A
Solution B: Acrylic monomer dispersion B
Adhesion (1): to a polyester urethane foam
Adhesion (2): to a polyether urethane foam As apparent from this Table 5, holding power is as good as 0.25 mm, but adhesion to urethane foams is insufficient.

Reference Example 2

An acrylic emulsion was prepared under the exactly same conditions as those of said Reference example 1 except that the amount of rosin ester KE364c was increased to 5.3 g (5.3%), and subsequently a single-side adhesive tape was prepared therefrom.

Measurement results are shown in the above Table 5. Holding power was only 6 minutes, and adhesion to urethane was also a quite insufficient level of only 25 g in CF mode because of too weak cohesive force of the acrylic polymer.

As the rosin ester has a stronger chain transfer tendency than xylene resin, it still gives holding power at a proportion of 3.1% but no longer at a proportion of 5.3%, as demonstrated by Reference examples 1 and 2.

The foregoing Reference examples 1 and 2 prove that rosin ester resins should desirably exist in a proportion of 3% or less when they are used as a major component in a tackifier in one acrylic monomer dispersion according to the present invention.

Industrial Applicability

According to the present invention, good wettability can be attained because holding power is obtained without increasing the crosslinking density of the entire acrylic polymer as previously. Especially, adhesion to polyolefin materials or rough surfaces, particularly polymer foams is good as well as holding power.

In addition, acrylic emulsions of the present invention incur no danger of environmental problems because they are aqueous.

What is claimed is:

1. An acrylic emulsion obtained by
carrying out a polymerization reaction of a first acrylic monomer dispersion,
adding a second acrylic monomer dispersion to said first acrylic monomer dispersion, and
carrying out a further polymerization reaction wherein said first acrylic monomer dispersion contains acrylic monomer and tackifier in a first proportion to acrylic monomer contained in said first acrylic monomer dispersion, and said second acrylic monomer dispersion contains acrylic monomer and tackifier in a second proportion to acrylic monomer contained in said second acrylic monomer dispersion, and wherein the proportion of tackifier in said first acrylic monomer dispersion is lower than the proportion of tackifier in said second acrylic monomer dispersion.

2. An acrylic emulsion according to claim 1 wherein the tackifier in said first acrylic monomer dispersion is based on a xylene resin contained at a weight proportion of 6% or less on the basis of the weight of the acrylic monomer in said first acrylic monomer dispersion.

3. An acrylic emulsion according to claim 2 wherein each of said first and second acrylic monomer dispersions is an aqueous emulsion dispersion.

4. An acrylic emulsion according to claim 3 wherein the acrylic monomer in said first and second acrylic monomer dispersions does not contain any multifunctional monomer.

5. An acrylic emulsion according to claim 1 wherein the tackifier in said first acrylic monomer dispersion is based on a rosin ester resin contained at a weight proportion of 3% or less on the basis of the total weight of said acrylic monomer dispersion.

6. An acrylic emulsion according to claim 5 wherein each of said first and second acrylic monomer dispersions is an aqueous emulsion dispersion.

7. An acrylic emulsion according to claim 6 wherein the acrylic monomer in said first and second acrylic monomer dispersions does not contain any multifunctional monomer.

8. An adhesive tape comprising an adhesive layer consisting of an adhesive composition containing an acrylic emulsion according to claim 1 formed on at least one face of a substrate.

9. A process for preparing an acrylic emulsion, comprising, carrying out a polymerization reaction of a first acrylic monomer dispersion,
adding a second acrylic monomer dispersion to said first acrylic monomer dispersion, and
carrying out a further polymerization reaction wherein said first acrylic monomer dispersion contains acrylic monomer and tackifier in a first proportion to acrylic monomer contained in said first acrylic monomer dispersion, and said second acrylic monomer dispersion contains acrylic monomer and tackifier in a second proportion to acrylic monomer contained in said second acrylic monomer dispersion, and wherein the proportion of tackifier in said first acrylic monomer dispersion is lower than the proportion of tackifier in said second acrylic monomer dispersion.

10. A process for preparing an acrylic emulsion according to claim 9 using a xylene resin as a major component of the tackifier in said first acrylic monomer dispersion, wherein said tackifier is contained at a proportion of 6% or less on the basis of the weight of the acrylic monomer.

11. A process for preparing an acrylic emulsion according to claim 10 which uses an aqueous emulsion dispersion as each of said first and second acrylic monomer dispersions.

12. A process for preparing an acrylic emulsion according to claim 11 wherein the acrylic monomer in each of said first and second acrylic monomer dispersions does not contain any multifunctional monomer.

13. A process for preparing an acrylic emulsion according to claim 9 using a rosin ester resin as a major component of the tackifier in said first acrylic monomer dispersion, wherein said tackifier is contained at a proportion of 3% or less on the basis of the total weight of said first acrylic monomer dispersion.

14. A process for preparing an acrylic emulsion according to claim 13, which uses an aqueous emulsion dispersion as each of said first and second acrylic monomer dispersions.

15. A process for preparing an acrylic emulsion according to claim 14 wherein the acrylic monomer in each of said first and second acrylic monomer dispersions does not contain any multifunctional monomer.

16. An adhesive tape comprising an adhesive layer consisting of an adhesive composition containing an acrylic emulsion according to claim 2 formed on at least one face of a substrate.

* * * * *